Oct. 13, 1931.  J. A. BOLTON  1,827,555
APPARATUS FOR DISPENSING LIQUIDS
Filed April 2, 1930  2 Sheets-Sheet 1
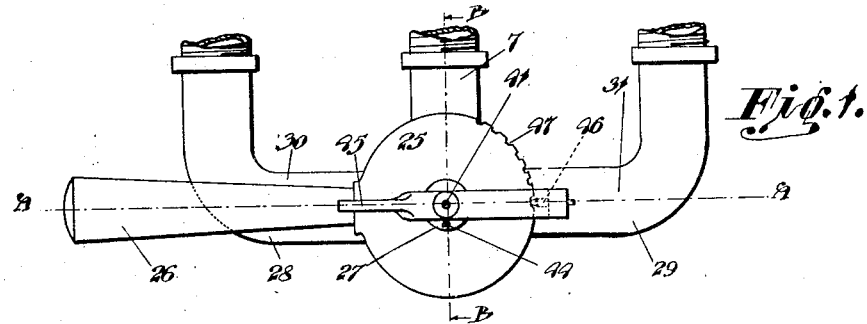
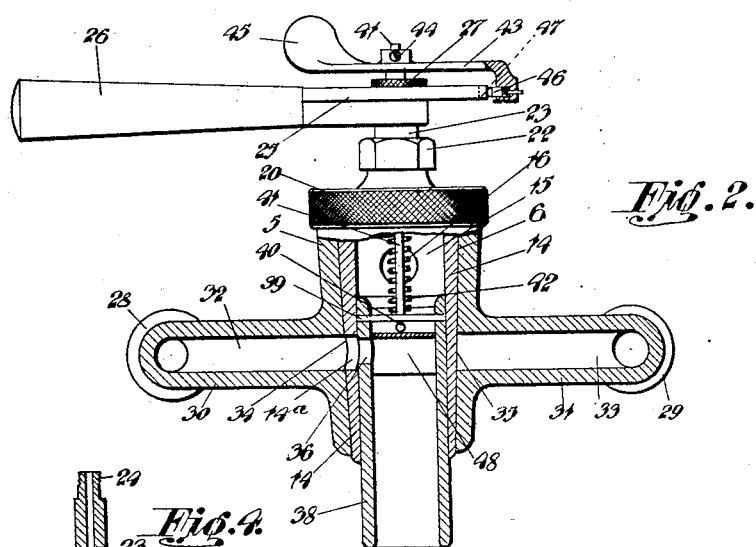
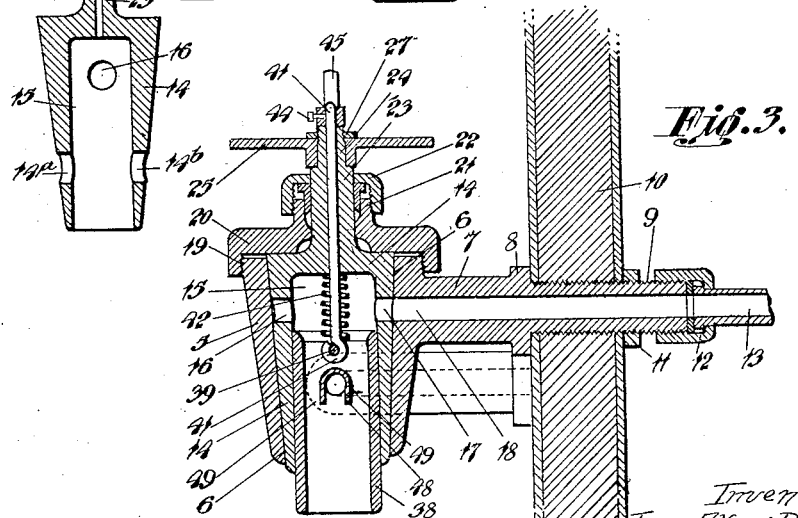

Oct. 13, 1931.   J. A. BOLTON   1,827,555
APPARATUS FOR DISPENSING LIQUIDS
Filed April 2, 1930   2 Sheets-Sheet 2
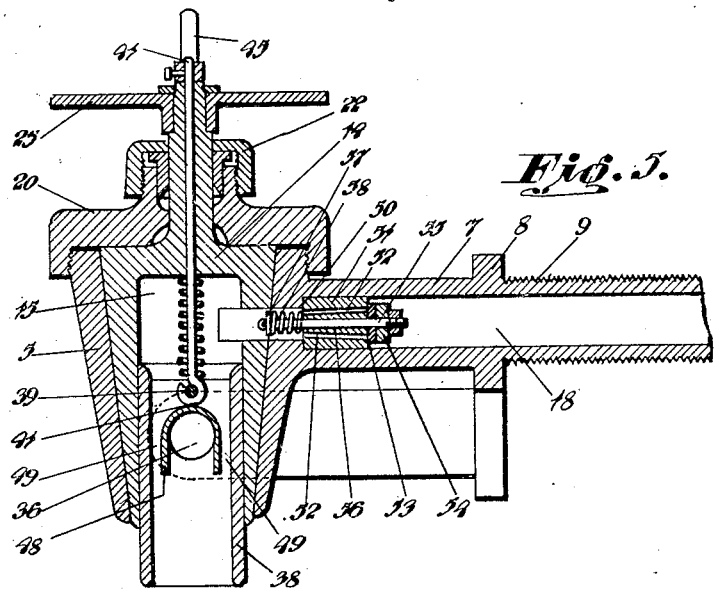
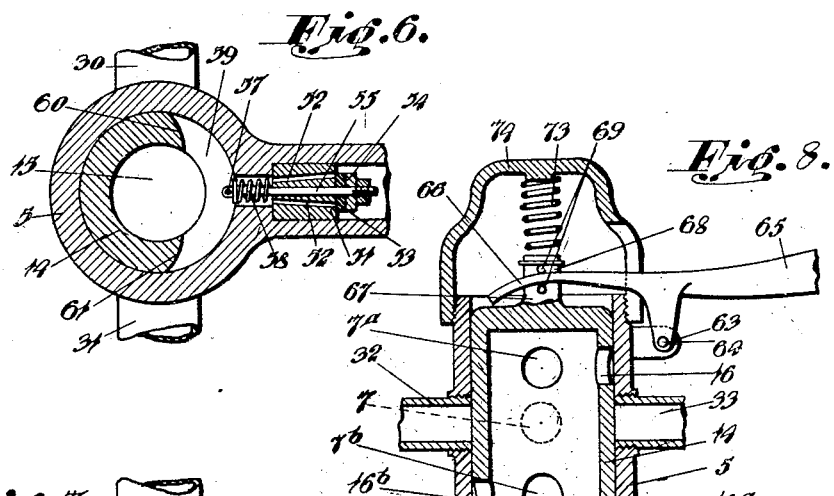
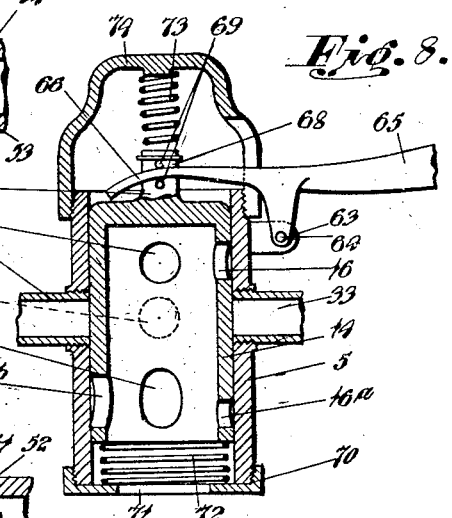
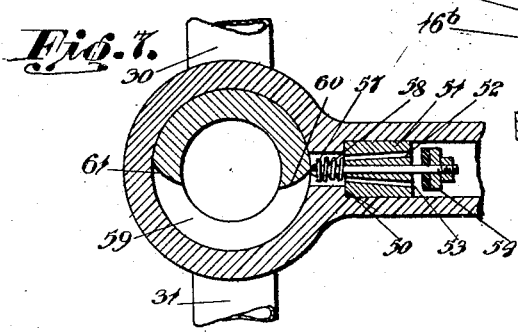
Inventor:-
James Alfred Bolton
by
Langner, Parry, Card & Langner
Attys.

Patented Oct. 13, 1931

1,827,555

UNITED STATES PATENT OFFICE

JAMES ALFRED BOLTON, OF LOWER PLENTY, VIA HEIDELBERG, NEAR MELBOURNE, VICTORIA, AUSTRALIA

APPARATUS FOR DISPENSING LIQUIDS

Application filed April 2, 1930, Serial No. 441,139, and in Australia August 13, 1929.

This invention relates to apparatus for dispensing liquids and is particularly adapted for dispensing fruit juices, syrups and the like.

The object of the invention is to provide means whereby one or more fruit juices, syrups or the like, hereinafter referred to as juices, and water, aerated water, or the like, hereinafter referred to as water, may be dispensed in proportional mixture as required.

The invention is characterized by the use of a valve or cock, preferably of the tapered hollow plug type, in which a female member connects a source of water supply and the sources of two juice supplies, a male member in said female member, adapted to be manipulated so that water and either one of the juice supplies are simultaneously opened; or, the water and two juice supplies are simultaneously opened, and means combined therewith for adjusting the flow of the juice supply in relation to the quantity of water.

A further essential feature embodied in the invention consists in means combined with the valve or cock to allow of the valve to operate under high pressure water supply.

In order that the invention may be more readily understood, it will now be described with reference to the accompanying drawings in which:—

Figure 1 is a view in plan of the improved apparatus for dispensing liquids.

Figure 2 is a view in sectional elevation of Fifure 1 taken on the line A—A Figure 1.

Figure 3 is a view in vertical central section taken on the line B—B Figure 1 and illustrating the appliance fitted to a liquid container.

Figure 4 is a view of the male member of the valve in modified form.

Figure 5 is a view in section of a modification and

Figures 6 and 7 are views in horizontal section showing the closed and open positions of the valve in relation to the high pressure service.

Figure 8 is a view in section of a modified construction.

According to this invention, and where, for instance, orange and lemon juice are to be separately dispensed, I provide a cock or valve preferably of the tapered hollow plug type and comprises a body member 5 formed with a central bore 6 and which forms the female portion of the valve, and from the upper portion of which at right angles extends the horizontal inlet tube 7 flanged as at 8 and formed with an external thread 9 threading into the dispensing cooler 10 to which the valve is adapted.

The valve tube 7 is held to the cooler by the nut 11 and a union nut 12 connects the water supply pipe 13 to the tube 7.

Within the bore 6 of the tapered female member 5 is disposed a tapered male member 14 suitably bored or hollowed out as at 15 from the bottom, and this male member 14 is provided with oppositely disposed orifices 16—17 which are adapted to register with the outlet end 18 of the water inlet tube 7 of the female member 5.

When the male member 14 is turned so that any one of the orifices 16 or 17 register with the passage 18 of the tube 7 of the female member 5 the water is caused to flow through the tube 7 into the bore of the male member 14 thence to the receiving receptacle.

To close or cut out the water supply, the male member 14 is turned so that neither of the orifices 16—17 are in registration with the inlet tube 7.

The female member 5 is threaded at 19 to receive a threaded cap 20 which has a threaded top 21 receiving a gland 22 and through which the upper extension 23 of the male member 14 extends, the male member 14 being further reduced in diameter as at 24 where it receives the disc 25 of a handle 26, the handle being retained on the portion 24 of the male member 14 by the nut 27.

Below the level of the aerated or other water inlet tube 7 are two branch tubes 28—29 each extending from a fruit juice or syrup supply and by the bends 30—30 join or form a part of the female member 5, the liquid passages 32—33 being in the path of an orifice 14a in the male member 14 and these orifices 34 or 35, when in registration with the orifice 14a, allow either kind of fruit juice or syrup to be dispensed through the respective pipes 28—29 to mix with the aerated or other water, or two deliveries of one kind of juice, or, if the male member 14 were provided with an additional orifice so that it has two orifices, simultaneously registering with the pipes 28 and 29, simultaneous deliveries of different kinds of fruit juice or two deliveries of one kind of juice may be made to mix with the water.

In the construction illustrated, the passages 32, 33 are shown with the orifice 34 in registration with the orifice 14a in the male member to allow of a flow of juice or syrup to the bore of the male member through the passage 32 while the flow through the passage 33 is cut off or shut owing to the orifice 14a not being in registration with the passage 33, but if the male member 14 were formed with two orifices 14a, 14b adapted to register simultaneously with the passages 32 and 33, it is obvious that when they so register, the juices or syrups through both passages 32—33 would flow simultaneously and be delivered with the water to the receptacle.

In the construction illustrated the juices or syrups are not free to be delivered unless the orifice 36 of a sleeve 38, disposed rotatably or otherwise adjustably disposed in the bore of the male member 14, registers with the orifice 14a of the male member 14 and the passages 32 or 33 of the female member 5 and this sleeve 38 is normally set to rotate with the male member 14 with the orifices of each member 38 and 14 in registration with each other, but in order to control the quantity of juice to be delivered in relation to the flow of the water, the orifice 36 may have a relative adjustment to the orifice 14a of the male member 14 so that the sleeve 38 is adapted to partially close and so vary the opening of the orifice 14a of the male member 14 and when in set position vary the amount of juice delivered on each operation of the valve through the maximum opening to the minimum amount predetermined by the setting of the orifice 36 of the sleeve 38 in relation to the orifices 14a of the male member 14.

The ratio of flow of juice to the water is preferably effected by mounting a cross pin 39 in the top end of the sleeve 38 and hooking the end 40 of a vertical rod 41 around it, the rod 41 extending upwardly through the upper extension 23 of the male member 14, a spring 42 surrounding the rod 41 between the hook 40 and the underside 42 of the upper bored surface of the male member 14.

The top of the rod 41 is fitted with a gauge arm 43 held to the top of the rod 41 by a set screw 44, a finger piece 45 extending towards the handle 26 and the opposite portion of the arm 43 extends to the outer end of the disc 25 which is serrated, and received in the serrations 47 is a pin 46 on the arm 43 so that, according to the fixed set of the pin 46 in the serrations 47, so the quantity of juice in relation to the water is regulated in a predetermined manner, and the opening of the orifice 14a in relation to the passages 32—33 of the female member is normal or limited as required.

To assist the flow of the juices, a hood or saddle 48 is disposed in line with the orifices 36 of the sleeve 38 with spaces 49 on either side of the water flow, and this assists in directing the flow of the juices through the sleeve 38 with the water from the passage 7 to the receiver at the mouth of the valve.

From the foregoing description, and the drawings, it will be obvious that when the handle 26 is turned in one direction, the male member 14 and sleeve 38 are caused to rotate within the female member 5 and the one set of orifices 16 or 17, passage 18, passages 32 or 33, orifice 14a, and sleeve orifice 36 register thus water flows with juice out of the delivery end of the valve in the required proportion to a receiver.

Thus the handle 26 of the valve is moved to open the valve to allow water and juice from one source of juice supply to flow to the receiver, and a further movement allows of water from the same supply and juice from another source of supply, and at the intermediate positions the valve is of course closed.

In lieu of the saddle 48 a short pipe may lead from the orifice 36 and extend into the bore of the sleeve 38 being bent downwardly so that the water passing through the central bore of the sleeve 38 facilitates the discharge of the juice.

As above described, two juices can be mixed with water in which case the juice inlet orifices are so arranged that when the valve is open, both of the juice orifices register with outlet orifices 14a, 14b in the male member 14 as illustrated in Figure 4.

In the modification illustrated in Figures 5, 6 and 7 the valve or cock above described is adapted to operate with a high pressure water supply and this is effected by a very simple modification.

To carry out this object the passage 18 of the tube 7 of the female member is enlarged and the shoulder 50 near the inlet orifice is fitted with a plug 51 having water ports 52 therein, the ports being normally closed at the face 53 of the plug by a valve 54 seating against said face so that the pressure of the water normally retains the valve 54 closed and water is prevented from entering the ports 52 to be delivered through the main valve.

This valve 54 is supported on a horizontal stem 55 passing through a bore 56 in the plug 51 and past the front face thereof into the orifices of the female and male member where it is fitted with a pin 57 retaining a spring 58 which functions to commence or effect the closure of the valve 54 against its seat 53 of the plug 51.

This stem 55 extends into the cut away portion 59 of the male member 14 in the path of two cam surfaces 60—61 of the male member 14 at the edges of the said cut away portion 59.

In the position illustrated in Figures 5 and 6 the valve 54 is held to its seat by the spring 58 and the water pressure behind it, but on the rotation of the male member 14 in either direction either the cam surface 60 or 61 contacts with the stem 55 and forces the valve 54 from its seat 53 and water under pressure passes through the ports 52 and past the cut away portion 59 into the passage 15 of the male member 14 to be delivered with the juice.

When the male member 14 returns so that the stem 55 is out of contact with the cam surfaces 60—61 as illustrated in Figures 5 and 6 the valve 54 automatically closes and shuts off the water supply owing to the cut away portion 59 registering with the stem 55 and the inlet valve 54 urged by the spring 58 is closed upon its seat thus preventing admission of water to the main valve.

In the modification illustrated in Figure 8 the partially rotatable plug is dispensed with and in lieu thereof a slidable male member 14 is used, said member being disposed in the female member 5.

The female member 5 receives the pipes 32 and 33 from the syrup or juice supply while the soda water or other dilutent enters the bore 7a as shown at 7.

Disposed on the side of the female member 5 is a lug 63 preferably of the bifurcated type, said lug 63 pivotally supporting at 64 a lever member 65 the inner end 66 of which passes into a slot 67 in the extension 68 formed on or fitted to the male member 14, rollers as 69 being disposed in said slot as shown and against which the end 66 of the lever 65 bears.

The male member 14 is provided with orifices 16, 16a and 16b, the latter orifice being longer than either 16 or 16a.

The bottom of the female member 5 is provided with a nut member 70 having an opening 71 therein through which the fluid will pass to the vessel while a spring 72 is disposed between the nut 70 and lower end of the male member 14 to counteract the action of the spring 73 disposed in the cap 74 having a slot therein to permit the lever 65 being operated.

The inlet of the soda water or other dilutent is shown at 7 by dotted lines where it enters the female member 5, orifices 7a and 7b being provided in the male member 14 as shown.

The normal position of the male member 14 in relation to the female member 5 is as shown in the drawings when all ports are closed, but when it is desired to draw syrup or juice from the pipe 33 the lever 65 is raised which brings the orifice 16 into registration with the said pipe 33 and simultaneously the soda water orifice 7a registers with the orifice 7 in the female member 5, release of the lever 65 closing all orifices by the coaction of the springs 72 and 73.

When it is desired to draw syrup or juice from the pipe 32 the lever 65 is depressed bringing part of the orifice 16b into registration with the said pipe 32 and at the same time the orifice 7b in the male member 14 registers with the orifice 7 in the female member thus delivering syrup or juice simultaneously with dilutent.

When it is desired to draw two syrups or juices to obtain a blend the lever 65 is depressed until the lower half of the orifice 16b registers with the pipe 32 and the orifice 16a with the pipe 33 the dilutent as soda water passing outwardly through the orifice 7b in the male member 14, when on the release of pressure from the lever 65 the springs 72 and 73 function to cut off fluid supply by closing the respective orifices as shown in Figure 8.

It will be obvious that the water is caused to flow through the main valve simultaneously with the juice in the manner described with reference to Figures 1 to 4 of the drawings.

I desire it to be understood that various improvements and modifications may be embodied without departing from the spirit and scope of the invention, the essential features and functions of which are above described.

What I do claim as my invention and desire to secure by Letters Patent is:—

1. Apparatus for dispensing liquids comprising a fixed female member internally bored having inlet pipes from a water supply and from two sources of juice supply, the inlet ports of the female member being normally in horizontal line, a male member internally bored from the underside adapted to slide in said female member and a connecting lever adapted to move the male member in either direction, water inlet ports in said male member normally positioned so that one is above and the other below the water inlet port of the female member, a substantially long port on one side of the male member adapted to move over one of the juice supply ports of the female member and two ports on the other side of the male member normally spaced one above and the other below the inlet port of the female member of the other juice supply, the male member being slidably operated so that one or two of the juice supplies are opened and the water supply is opened for the simultaneous delivery of a mixed drink as herein described.

2. Apparatus for dispensing liquids consisting in the combination of a fixed female member fitted with a detachable cap or hood and internally bored, a source of water supply leading to a port in the female member, two sources of juice supply each leading to a port on opposite sides of the female member in line with the water inlet port, a male member internally bored from the underside slidably mounted in the female member, two ports on the male member one above and one below the water inlet port of the female member, an elongated port on one side of the male member normally disposed below the inlet port of one of the juice supplies of the female member, and two ports on the opposite side of the male member one normally above and one normally below the inlet port of the other juice supply to the female member, a lever connecting the head of the male member adapted to move it in either direction in the female member, a spring above the head of the male member and a spring below the mouth of the male member, the whole being constructed, arranged and operating substantially as described and illustrated in the drawings.

Signed at Melbourne, Victoria, Australia, this 24th day of February, A. D. 1930.

JAMES ALFRED BOLTON.